L. L. Hill,

Bellows.

No. 1,417. Reissued Feb. 24, 1863.

Witnesses:
A. A. Gilly
B. F. Wright

Inventor.
Levi L. Hill

N. PETERS, PHOTO-LITHOGRAPHER, WASHINGTON, D. C.

UNITED STATES PATENT OFFICE.

LEVI L. HILL, OF NEW YORK, N. Y., LATE OF GREENPORT, NEW YORK.

IMPROVEMENT IN CARBURETING AIR.

Specification forming part of Letters Patent No. 26,497, dated December 20, 1859; Reissue No. 1,417, dated February 24, 1863.

*To all whom it may concern:*

Be it known that I, LEVI L. HILL, of Greenport, in the county of Columbia and State of New York, have invented a new and improved mode of charging air with hydrocarbon vapors and supplying the so-charged air at a suitable and uniform pressure for combustion to produce light and heat; and I do hereby declare that the following is a full, clear, and exact description of the same, reference being had to the accompanying drawings, which represent the apparatus which I have devised for accomplishing this purpose in the most desirable manner.

Figure 1:
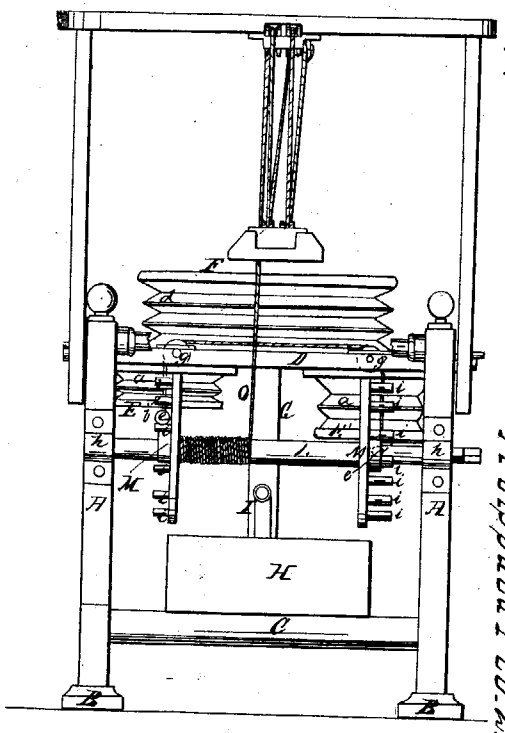
Figure 2:
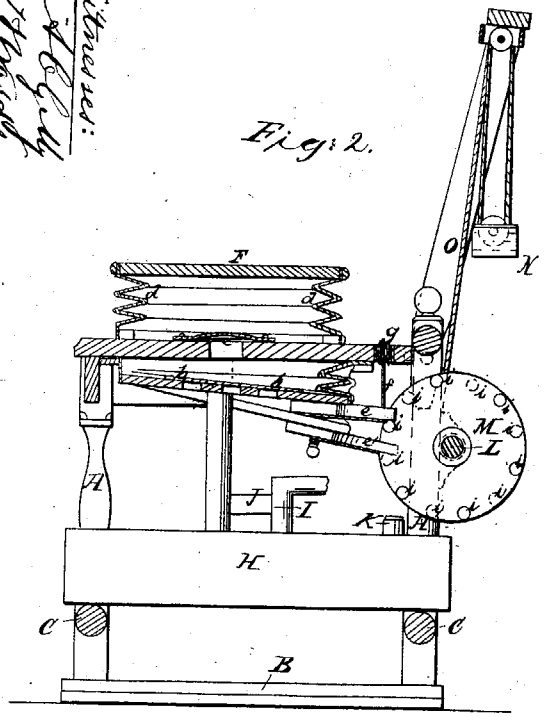

Figure 1 is a front elevation of the apparatus. Fig. 2 is a vertical section of the same, taken at right angles to Fig. 1.

Similar letters of reference indicate like parts in both figures.

To enable others skilled in the art to make this apparatus and apply my invention, I will proceed to describe the apparatus and its mode of operation.

A B C D is a square frame composed of four pillars, A, erected upon feet B, stayed together by horizontal cross-pieces C, and supporting a horizontal board, D.

To the under side of the board D, which is stationary, there are hinged one end of each of two boards, E E′, the other edges of which are connected with the board D by means of india-rubber cloth *a a*, or other flexible material, which is impervious to air, in such a manner that, by the application of inlet-valves *b b* in the said boards E E′ and outlet-valves *c* in the board D above, two bellows are formed. Above the said board D there is constructed an air-receiver by attaching the sides of a board, F, to the said board D, by india-rubber cloth or other flexible and impervious material *d d*, the said air-receiver covering the outlet-valves *c* of the two bellows so that they discharge their air thereinto.

Between the two bellows there is a hole bored in the board D, to which is connected a short pipe, G, which forms the outlet from the air-receiver to the box or vessel H, which contains the hydrocarbon liquid that is to be vaporized and in that condition mixed with the air. This box or vessel H may have its interior divided horizontally into different compartments for containing the liquid, or otherwise so constructed in various ways as to present the liquid in such form that the air, in passing from the pipe G to its outlet I, (which is to communicate with the burners,) must pass over a very extensive surface of the liquid. The said box or vessel is of such form and size as to permit its arrangement in the manner shown in the drawings, or in any other suitable position and form. When the temperature of the atmosphere is low, or the fluid used not sufficiently volatile at ordinary temperatures, heat may be applied to aid in the development of the hydrocarbon vapor. The box or vessel H has its air-inlet pipe G and its outlet-pipe I connected by a pipe, J, which should be furnished with a stop-cock or valve. The object of this pipe J, with its stop-cock or valve, is to furnish air directly from the bellows or blower without passing through the box or vessel H to the pipe I, in such quantities as may be required to mingle with that that has been carbonized by passing through the box or vessel H, to secure its most perfect combustion, and to give the effect of a direct blast or jet when it is important to increase the heating effect of the combustion. The said box or vessel H is also furnished with a separate opening, K, for the introduction of the liquid to be vaporized. The two boards or flaps E E′ of the bellows have secured at their vibrating end two arms, *e e′*, one to each, and said arms are connected together by a cord, *f*, which runs over two pulleys, *g g*, attached to the frame, the length of said cord and the arrangement of the pulleys being such that one bellows is only permitted to be distended or opened to the fullest extent of which it is capable while the other is closed up or collapsed. The bellows should be operated alternately and alternate motion may be given them by any suitable mechanism—such, for example, as a drum with pins projecting from its periphery. By this arrangement of the pins the two bellows are operated alternately, the length of the cord *f* being so adjusted by turning a screw, *k*, which attaches it to the arms *e e′*, and upon which it is wound two or three times, that a pin will commence to operate on its respective bellows just at the instant that another pin is escaping from the other bellows. The rotary motion of the shaft L, which is employed to operate the bellows, is derived from a weight, N, suspended from a cord, O, which is wound upon the said shaft L or upon a barrel secured thereon, the said weight being applied to the cord in combination with any such system of pulleys as may be desirable to make the shaft rotate for a considerable time with a comparatively short descent of the weight. The pressure of air is to be regulated by the weight N and by a weight on the top F of the air-receiver to properly counterbalance the weight N, or by any other arrangement that will give the necessary force to the air discharged from the air-receiver.

Having thus fully described my invention, what I claim therein, and desire to secure by Letters Patent of the United States, is—

1. Charging air with hydrocarbon vapor by means of an apparatus composed of a vaporizing vessel, bellows or blower, air-receiver, induction and eduction pipe, in combination with an independent air-pipe, substantially as shown and described.

2. Combining a current of atmospheric air direct from a bellows or blower, and capable of being regulated as to pressure and quantity, with another current of air that has been passed over or through a more or less volatile hydrocarbon fluid, and utilizing by combustion the mixture of air and hydrocarbon vapors thus formed for generating light or heat, or both.

LEVI L. HILL.

Witnesses:
W. R. BARRETT,
JAMES F. CHAMBERLAIN.